(12) United States Patent
Setlur et al.

(10) Patent No.: US 9,390,137 B2
(45) Date of Patent: Jul. 12, 2016

(54) METHOD AND APPARATUS FOR PROVIDING AN ORDERING METRIC FOR A MULTI-DIMENSIONAL CONTEXTUAL QUERY

(75) Inventors: Vidya Setlur, Portola Valley, CA (US); Agathe Battestini, San Francisco, CA (US)

(73) Assignee: NOKIA TECHNOLOGIES OY, Espoo (FI)

( * ) Notice: Subject to any disclaimer, the term of this patent is extended or adjusted under 35 U.S.C. 154(b) by 764 days.

(21) Appl. No.: 13/172,425

(22) Filed: Jun. 29, 2011

(65) Prior Publication Data

US 2013/0007011 A1    Jan. 3, 2013

(51) Int. Cl.
G06F 7/00 (2006.01)
G06F 17/00 (2006.01)
G06F 17/30 (2006.01)

(52) U.S. Cl.
CPC ............... *G06F 17/30528* (2013.01)

(58) Field of Classification Search
USPC ........ 707/732, 726, 791; 706/45, 62; 715/811
See application file for complete search history.

(56) References Cited

U.S. PATENT DOCUMENTS

| | | | |
|---|---|---|---|
| 6,693,651 B2 | 2/2004 | Biebesheimer et al. | |
| 7,330,849 B2* | 2/2008 | Gerasoulis et al. | |
| 7,747,618 B2* | 6/2010 | Zeng et al. | 707/732 |
| 7,853,574 B2 | 12/2010 | Kraenzel et al. | |
| 2002/0055924 A1 | 5/2002 | Liming | |
| 2002/0188589 A1 | 12/2002 | Salmenkaita et al. | |
| 2003/0036848 A1 | 2/2003 | Sheha et al. | |
| 2004/0110515 A1 | 6/2004 | Blumberg et al. | |
| 2004/0162830 A1 | 8/2004 | Shirwadkar et al. | |
| 2008/0301092 A1 | 12/2008 | Jayanti et al. | |
| 2009/0177386 A1 | 7/2009 | Haase | |
| 2009/0228196 A1 | 9/2009 | Raab | |
| 2010/0094904 A1* | 4/2010 | Jandhyala | 707/791 |
| 2010/0145976 A1 | 6/2010 | Higgins et al. | |
| 2010/0223261 A1* | 9/2010 | Sarkar | 707/726 |
| 2010/0241663 A1 | 9/2010 | Huang et al. | |

(Continued)

FOREIGN PATENT DOCUMENTS

| | | |
|---|---|---|
| KR | 2007-0061024 A | 6/2007 |
| WO | WO 01/82556 A2 | 11/2001 |
| WO | WO 01/82562 A2 | 11/2001 |
| WO | WO 2010/016989 A2 | 2/2010 |
| WO | WO 2010/039459 A2 | 4/2010 |

OTHER PUBLICATIONS

International Search Report for PCT/FI2012/050468 dated Sep. 6, 2012, pp. 1-6.

(Continued)

*Primary Examiner* — Susan Chen
(74) *Attorney, Agent, or Firm* — Ditthavong & Steiner, P.C.

(57) ABSTRACT

An approach is provided for providing an ordering metric for a multi-dimensional contextual query. An ordering platform determines a multi-dimensional query associated with at least one user device, wherein the multi-dimensional query specifies, at least in part, one or more personas, one or more contexts, or a combination thereof associated with the at least one user device. The ordering platform further causes, at least in part, an execution of the multi-dimensional query on at least one context-sensitive database to generate one or more results. The ordering platform further determines at least one ordering metric for the one or more results based, at least in part, on one or more user contextual attributes of the at least one user device.

20 Claims, 11 Drawing Sheets

(56) References Cited

U.S. PATENT DOCUMENTS

2011/0055203 A1 3/2011 Gutt et al.
2011/0078159 A1* 3/2011 Li et al. .................. 707/749

OTHER PUBLICATIONS

Written Opinion for PCT/FI2012/050468 dated Sep. 6, 2012, pp. 1-9.

* cited by examiner

METHOD AND APPARATUS FOR PROVIDING AN ORDERING METRIC FOR A MULTI-DIMENSIONAL CONTEXTUAL QUERY

BACKGROUND

Service providers and device manufacturers (e.g., wireless, cellular, etc.) are continually challenged to deliver value and convenience to consumers by, for example, providing compelling network services and relevant content. Often, such network and content services rely on the context of the users accessing the network services or the devices by which the users access the network services. Determining the context becomes inadequate when multiple contexts and/or multiple users' actions need to be analyzed over a period of time—particularly when the context is determined in conjunction with a mobile device that has limited processing power and/or bandwidth. However, there still exists a need to have rich, accurate datasets that span different context-aware situations to allow applications that utilize the datasets to be useful for multiple contexts and/or multiple users and provide access to such datasets to mobile devices in a practical manner. As such, device manufacturers and service providers face significant technical challenges to providing rich, situational-aware, context-sensitive datasets in a mobile environment.

SOME EXAMPLE EMBODIMENTS

Therefore, there is a need for an approach for providing an ordering metric for a multi-dimensional contextual query to provide context-aware querying, retrieval and presentation of results on, for example, a mobile interface.

According to one embodiment, a method comprises determining a multi-dimensional query associated with at least one user device, wherein the multi-dimensional query specifies, at least in part, one or more personas, one or more contexts, or a combination thereof associated with the at least one user device. The method also comprises causing, at least in part, an execution of the multi-dimensional query on at least one context-sensitive database to generate one or more results. The method further comprises determining at least one ordering metric for the one or more results based, at least in part, on one or more user contextual attributes of the at least one user device.

According to another embodiment, an apparatus comprises at least one processor, and at least one memory including computer program code for one or more computer programs, the at least one memory and the computer program code configured to, with the at least one processor, cause, at least in part, the apparatus to determine a multi-dimensional query associated with at least one user device, wherein the multi-dimensional query specifies, at least in part, one or more personas, one or more contexts, or a combination thereof associated with the at least one user device. The apparatus is also caused, at least in part, to execute the multi-dimensional query on at least one context-sensitive database to generate one or more results. The apparatus is further caused to determine at least one ordering metric for the one or more results based, at least in part, on one or more user contextual attributes of the at least one user device.

According to another embodiment, a computer-readable storage medium carries one or more sequences of one or more instructions which, when executed by one or more processors, cause, at least in part, an apparatus to determine a multi-dimensional query associated with at least one user device, wherein the multi-dimensional query specifies, at least in part, one or more personas, one or more contexts, or a combination thereof associated with the at least one user device. The apparatus is also caused, at least in part, to execute the multi-dimensional query on at least one context-sensitive database to generate one or more results. The apparatus is further caused to determine at least one ordering metric for the one or more results based, at least in part, on one or more user contextual attributes of the at least one user device.

According to another embodiment, an apparatus comprises means for determining a multi-dimensional query associated with at least one user device, wherein the multi-dimensional query specifies, at least in part, one or more personas, one or more contexts, or a combination thereof associated with the at least one user device. The apparatus also comprises means for causing, at least in part, an execution of the multi-dimensional query on at least one context-sensitive database to generate one or more results. The apparatus further comprises means for determining at least one ordering metric for the one or more results based, at least in part, on one or more user contextual attributes of the at least one user device.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing an ordering metric for a multi-dimensional contextual query are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although various embodiments are described with respect to context-aware databases storing points of interest, it is contemplated that the approach described herein may be used with other context-aware databases storing any type of contextually based information.

Figure 1:
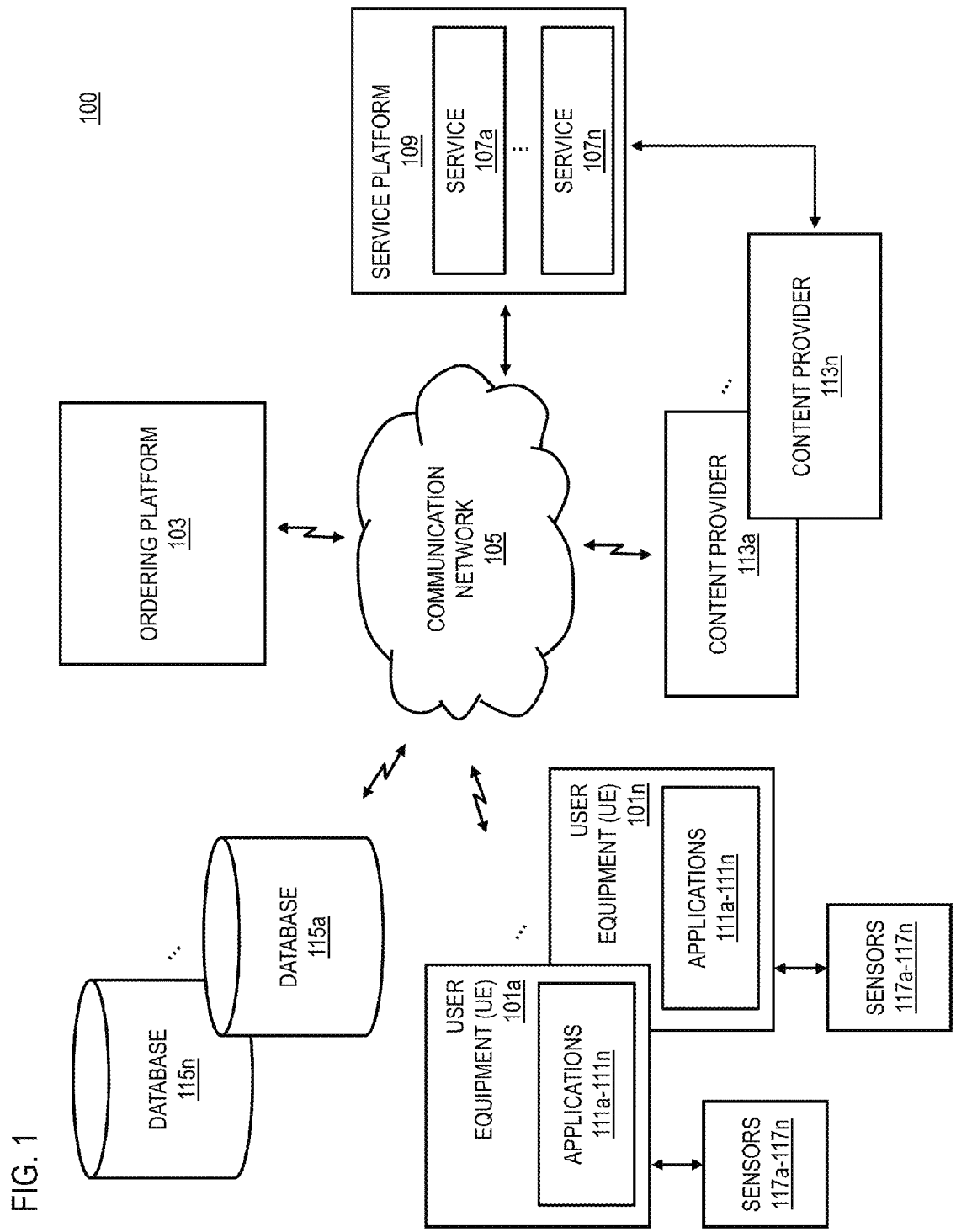
FIG. 1 is a diagram of a system capable of providing an ordering metric for a multi-dimensional contextual query, according to one embodiment.

FIG. 1 is a diagram of a system capable of providing an ordering metric for a multi-dimensional contextual query, according to one embodiment. As discussed above, services and/or content provided over a network to users' devices often rely on the current context of the users and/or the devices. When multiple contexts and/or multiple users' actions need to be analyzed over a period of time, adapting the applications to use the contexts and/or actions becomes inadequate. Although situation awareness can correlate specific contexts and user actions to specific contextual situations, using such situation awareness has not been incorporated into context-aware databases. Thus, there still exists a need to have rich, accurate datasets that span different context-aware situations to allow applications that utilize the datasets to be useful for multiple contexts and/or multiple users.

To address this problem, a system 100 of FIG. 1 introduces the capability to enrich and enhance situational-aware, context-sensitive databases using mechanisms on, for example, a mobile device. The system 100 also has the framework for allowing the mobile user to provide additional information concerning relevant attributes for a data entity in a context-aware database. The system 100 also introduces context-based attribute ordering in the interface of, for example, a mobile device to provide more fluid and less intensive context-aware querying, retrieval and presentation of contextual attributes of objects stored in databases.

As shown in FIG. 1, the system 100 comprises user equipment (UE) 101a-101n (collectively referred to as UE 101) having connectivity to an ordering platform 103 (discussed in detail below) via a communication network 105. The UE 101 include one or more executable applications 111a-111n (collectively referred to as applications 111) that include, for example, one or more mapping applications, messaging applications, calendar applications, context applications, sensor applications, etc. In communication with the UE 101 (e.g., within the UE 101, outside the UE 101) are one or more sensors 117a-117n (collectively referred to as sensors 117) that acquire information regarding the context of the user and/or the UE 101. The sensors 117 can collect any type of information depending on the type of sensor. For example, the sensors 117 can constitute accelerometers, gyroscopes, brightness sensors, moisture sensors, etc. that collect information regarding acceleration, light and water vapor of the UE 101 and the surrounding environment.

In communication with the ordering platform 103 and the UE 101 via the communication network 105 are databases 115a-115n (collectively referred to as databases 115). The databases 115 can be 2-dimensional, relational databases or multi-dimensional (e.g., 3-dimensional, N-dimensional, etc.) databases that are organized into hierarchies that specify an aggregation level and granularity of viewing data.

The databases store objects and information concerning the objects, such as object contextual attributes. The object contextual attributes correspond to the context of the objects, such as, for example, the geographic location of the objects (e.g., address, city, country, etc.), the type of object (e.g., restaurants, schools, parks, and playgrounds), and all other possible types of contextual information related to the objects. By way of example, for an object such as a park, the additional contextual attributes can include whether the park has a playground, whether the park has restrooms, whether the restrooms are clean, whether the park has food concessions, whether the food concessions have a wide range of choices, whether the park has a parking lot or street parking, whether access to the park is free, etc. Each one of these contextual attributes can be further defined by the accuracy, the precision and the resolution of the contextual attributes. For example, the contextual attributes regarding whether the restrooms are clean and/or whether the food concessions have a wide range of choices can have additional attributes indicating the accuracy, the precision and the resolution of the cleanliness of the concessions or the range of choices.

Attributes representing the accuracy, the precision and the resolution can be provided by the provider of the system 100, by the users of the system 100, or a combination thereof. For example, initially the values can be provided by the provider of the system 100 and can be modified, updated, or removed by the users of the system 100. The system 100 can also combine attributes of any one or more of the accuracy, the precision and the resolution into one, singular attribute. For instance, if the information about the cleanliness of the restrooms is both accurate and precise, a single attribute may correspond to "very clean." If the information about the cleanliness is accurate but not precise, the attribute may correspond to a range, such as "not clean-clean." In other instances, if the information regarding the cleanliness of the restroom is based on parts of the restroom, the system 100 may indicate the resolution of the information by providing an overall attribute of the cleanliness of the restroom, and also provide discrete attributes for the cleanliness of, for example, the sink, the toilet, the towels etc. within the restroom.

For multi-dimensional databases, each dimension is defined over a dimensional schema, which is a set of dimensional attributes. By way of example, one multidimensional schema can be user preferences attributes. The dimensional attributes of user preferences are, for example, users, location based preferences, context based preferences, behavior based preferences, etc. In this example, the user dimensional attribute is terminal and belongs to the first category level, the location based preferences belongs to the second category level, the context based preferences belongs to the third category level, the behavior based preferences belongs to the fourth category level, etc. By way of further example, each of these dimensional attributes can have further nested multi-dimensional attributes. For example, the location based preferences can include current location based preferences, nearby location based preferences, far location based preferences, etc. where each of these specific location based preferences are representative of a smaller granularity of the location.

The system 100 also includes a service platform 109 that provides one or more services 107a-107n (collectively known as services 107) to one or more users and/or user devices. The services 107 can include, for example, location based services, mapping information services, social networking services, etc. In one embodiment, the service platform 109 includes a service 107b that can convert a 2-dimensional, relational database into a multi-dimensional database for use with the multi-dimensional query of the system 100 according to well-known conversion techniques.

Also included within the system 100 is one or more content providers 113a-113n (collectively referred to as content providers 113) that can provide content to one or more services 107 of the service platform 109, one or more UE 101, one or more databases 115 and/or the ordering platform 103. By way of example, as the information regarding the objects stored in the databases 115 changes, the content providers 113 can update the information within the databases. When new objects are created or removed, such as when a new point of interest is created or a new point of interest is closed, the content providers 113 can update the new information within the databases 115.

By way of example, the communication network 105 of the system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the UE 101, the ordering platform 103, the service platform 109, the content providers 113 and the databases 115 communicate with each other and other components of the communication network 105 using well known, new and/or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
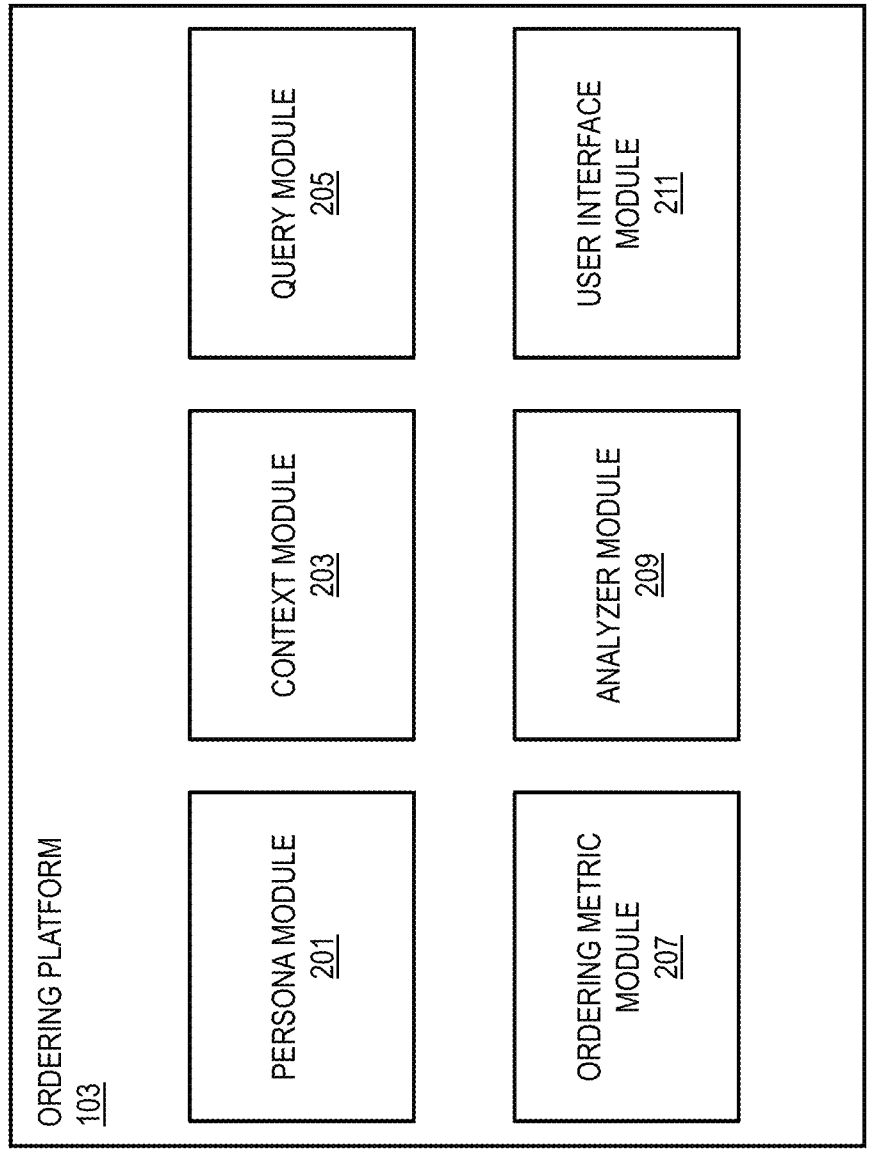
FIG. 2 is a diagram of the components of an ordering platform, according to one embodiment.

FIG. 2 is a diagram of the components of the ordering platform 103, according to one embodiment. By way of example, the ordering platform 103 includes one or more components for providing an ordering metric for a multi-dimensional contextual query. It is contemplated that the functions of these components may be combined in one or more components or performed by other components of equivalent functionality. For example, the functions of these components may be embodied in one or more applications 111 executed on a UE 101. Alternatively, the functions of these components can be embodied in one or more modules of the UE 101, or one or more services 107 on the service platform 109.

In this embodiment, the ordering platform 103 includes a persona module 201, a context module 203, a query module 205, an ordering metric module 207, an analyzer module 209, and a user interface module 211.

The persona module 201 determines one or more personas associated with a user of a UE 101 and/or a UE 101. The persona module 201 determines the one or more personas by, for example, a user or users of the UE 101 entering the information regarding the personas.

The personas represent the possible different combinations of users that can be associated with a specific UE 101. By way of example, a persona can represent the members of a family that are associated with the UE 101. The persona can also represent the members of a group of friends that are associated with the UE 101. The personas allow for the creation of situations associated with the UE 101 that correlate to user contextual attributes that form the multi-dimensional queries, in addition to, for example, context information, to generate a list of results from one or more databases 115 that can later be ordered according to an ordering metric.

In one embodiment, when a UE 101 first interfaces with the ordering platform 103, the persona module 201 determines a complete persona associated with the UE 101. By way of example, the complete persona includes representations of the type (e.g., gender, age group, disability, relationships, etc.) and quantity of the users that could possibly be associated with the UE 101. Such examples include one male parent, one female parent, and two infant daughters; one female parent, one teenage boy, and one infant boy; one disabled friend and a non-disabled friend, etc. The complete persona allows the ordering platform 103 to determine all possible personas that could be associated with the UE 101 based on the possible users associated with the UE 101. Thus, the complete persona allows the ordering platform 103 to determine all of the possible user contextual attributes that could be associated with the UE 101 based on the possible users associated with the UE 101.

In one embodiment, the persona module 201 determines one or more personas associated with users of a UE 101 at the time of querying and/or ordering of the one or more results of a multi-dimensional query. The persona module 201 determines the specific users that are associated with the UE 101, and, therefore, associated with the query and/or the ordering metric, and creates the multi-dimensional query based, at least in part, on the user contextual attributes associated with the persona. By way of example, certain user contextual attributes are associated with male parents, female parents, non-parent adults, teenagers, young children, infants, friends, disabled individuals, non-disabled individuals, etc. By indicating the number and type (e.g., gender, age group, disability, relationships, etc.) of users associated with the UE 101 at the time of the query and/or ordering of the one or more results, the ordering platform 103 automatically generates persona information and associates the persona information with user contextual attributes. By doing so, the persona module 201 allows the ordering platform 103 to have situational awareness over the users that are associated with the UE 101 and who are querying the databases 115.

The context module 203 determines the context associated with the user of the UE 101 and/or the UE 101 that is used to create the multi-dimensional query and/or used to create the ordering metric. The context may comprise, for example, the current location of the user, a future location of the user based on one or more mapping applications 111 running on the UE 101, a current or future appointment based on one or more calendar applications 111 running on the UE 101, etc. The context module 203 can determine the context from, for example, one or more applications 111 running on the UE 101, one or more modules of the UE 101, one or more sensors 117 associated with the UE 101, one or more services 107 associated with the UE 101, or any combination thereof. The context module 203 can also determine the context associated with the users and/or the UE 101 based on interaction information at a user interface of the UE 101. For example, the UE 101 may include user interfaces that allow the users of the UE 101 to enter context regarding the users and/or the UE 101.

In one embodiment, the context module 203 continuously, periodically, or a combination thereof, determines the context information of the user and/or the UE 101 before and after submitting the multi-dimensional query for creating and updating the ordering metric, as discussed below.

The query module 205 creates the multi-dimensional query based on, for example, one or more of the personas and the context acquired by the persona module 201 and he context module 203. The multi-dimensional query can also be based on, for example, one or more dimensions that are specific by a user of the UE 101.

In one embodiment, one dimension can include a contextual dimension for comparing one or more user contextual attributes to one or more object contextual attributes of one or more objects stored in the databases 115. By way of example, the contextual dimension can represent a normalized value of 0 to 1 that defines the most ideally matched object contextual attribute compared to a user contextual attribute. For example, if the context is location, a value of one is the most preferred location of the user and a value of zero is the least preferred location of the user. Thus, if the user contextual attribute for location is a specific latitude and longitude, or a specific street address, and an object has an object contextual attribute with the same latitude and longitude, or street address, the user contextual attribute and the object contextual attribute would have a normalized relation of one, being the most ideally matched.

In one embodiment, one dimension can include a contextual relation dimension for evaluating one or more relations among the one or more user contextual attributes and the one or more object contextual attributes. The contextual relation dimension specifies weighting information, priority information, or a combination thereof of the one or more user contextual attributes, the one or more object contextual attributes, or a combination thereof. Such relations include, for example, an equivalence relation (Q), a total ordering relation (T), and a partial ordering relation (P). In the case of the equivalence relation Q, the results that comply with the user contextual attributes, the one or more object contextual attributes, or a combination thereof are ordered without any special ordering. In the case of the total ordering relation T, the results are sorted based on the contextual dimension discussed above according to the rank of the user contextual attributes, the one or more object contextual attributes, or a combination thereof. In the case of the partial ordering relation P, the results are sorted based on a partial ordering of the contextual dimension discussed above based on the rank of the user contextual attributes, the one or more object contextual attributes, or a combination thereof.

In one embodiment, one dimension can include an inclusion dimension for determining whether to include respective ones of the one or more results of the multi-dimensional query in a list presented to the user on the user's device. By way of example, the inclusion dimension determines whether objects that include object contextual attributes that do not conform to the user contextual attributes are included or excluded in a list of objects presented to the user. The inclusion attribute can be, for example, unlisted excluded (X), where the objects that include object contextual attributes that do not conform to the user contextual attributes are excluded from the list, and unlisted included (N), where the objects that include object contextual attributes that do not conform to the user contextual attributes are included in the list but come last. The inclusion dimension can be used, for example, to exclude objects and or object information that is unsupported by a mobile device or that is too large to be transmitted over a network to the mobile device.

The query module 205 also executes the multi-dimensional query on the one of more databases 115.

The ordering metric module 207 creates the ordering metric that is used to order the results of the multi-dimensional query. The ordering metric module 207 determines the ordering metric based, at least in part, on one or more of the personas, one or more contexts, one or more of the user contextual attributes, one or more of the object contextual attributes, and one or more dimensions of the multi-dimensional query. In one embodiment, upon generating a list of results representing objects with corresponding object contextual attributes from the databases 115 based on the multi-dimensional query, the ordering metric module 207 generates an ordering metric to order the objects according to the object contextual attributes in comparison to the one or more of the personas, the one or more contexts, the one or more of the user contextual attributes, and the one or more dimensions of the multi-dimensional query. By way of example, the ordering metric orders the objects according to the object contextual attributes in relation to the user contextual attributes according to the contextual dimension and an equivalence relation Q for the contextual relation dimension. The ordering metric module 207 also continuously, periodically, or a combination thereof, monitors for changes in the one or more of the personas, the one or more contexts, the one or more of the user contextual attributes, the one or more of the object contextual attributes, and the one or more dimensions of the multi-dimensional query to reorder the objects based on a new ordering metric. Thus, by way of example, rather than creating a new multi-dimensional query and executing the multi-dimensional query at the databases 115 every time one of the personas, contexts, user contextual attributes, and/or object contextual attributes changes, the ordering platform rather merely updates the ordering metric and reorders the list of result objects with the corresponding object contextual attributes.

The analyzer module 209 determines the accuracy, the precision, and the resolution of the object contextual attributes stored in the databases 115 for the objects presented as results in response to the multi-dimensional query. The accuracy of the object contextual attributes represents the degree of closeness of the object contextual attribute to the actual (true) value. The precision of the object contextual attributes represents the degree of reproducibility of the measurement of the accuracy. The resolution of the object contextual attributes represents the degree of change that is detected. By way of example, some object contextual attributes are yes or no, such as whether a point of interest includes restrooms, parking, or are handicapped accessible. Such contextual attributes should have high degrees of accuracy and precision because there is only one objective answer (e.g., either yes or no). However, some object contextual attributes can be represented by a normalized value between 0 and 1, such as whether the restrooms are clean, whether the parking spaces can fit a full-sized automobile, whether a restaurant is family friendly, etc. Thus, the analyzer module 209 determines the accuracy, the precision, and the resolution values stored in the databases 115 corresponding to the objects and the object contextual attributes. In one embodiment, the databases 115 already contain the normalized and/or yes/no attributes corresponding to the object contextual attributes. Thus, the analyzer module 209 simply loads the information from the databases 115 and presents the information to the user along with the objects. In one embodiment, the databases 115 have multiple, raw indications of the accuracy, the precision, and the resolution of the object contextual attributes and the analyzer module 209 determines a normalized value for the raw indications. The analyzer module 209 can handle various types of values, ranging from yes/no, to normalized values, to non-normalized values, such as text string descriptions of the object contextual attributes.

In the case where the analyzer module 209 determines the value, the analyzer module 209 determines the accuracy, the precision, and the resolution of the object contextual attributes based on such values (e.g., yes/no, 0-1) stored in the databases 115 associated with the object contextual attributes. The analyzer module 209 determines the actual values based on a wide range of values according to a weighted sum, a weighted average, or a combination thereof of the actual values stored in the databases 115. The analyzer module 209 also interfaces with the user interface module 211 (discussed below) to present the determined values of the accuracy, the precision, and the resolution of the object contextual attributes to the user when the objects are presented as results of the multi-dimensional query.

The analyzer module 209 also receives information from the user, the user of the UE 101, one or more sensors associated with the UE 101, or a combination thereof to further update the values of the accuracy, the precision, and the resolution of the object contextual attributes. By way of example, if a restroom of a restaurant currently has a value of 0.8 associated with the cleanliness attribute based on two reviews or ratings and a user currently rates the cleanliness according as a 0.4 using the user interface of the UE 101, the analyzer module 209 updates the value of the cleanliness of the restroom as a value of 0.66 at the database 115.

The user interface module 211 provides the user interfaces for interfacing with the ordering platform 103. In one embodiment, where the ordering platform 103 is a separate element of the system 100, the user interface module 211 interfaces with one or more applications 111 running on the UE 101 or one or more hardware module of the UE 101 to provide the user interface on the UE 101 to interface with the ordering platform 103. In one embodiment, where the functions of the ordering platform 103 are embodied in one or more applications 111 running on the UE 101 or in one or more hardware modules of the UE 101, the user interface module 211 interfaces with one or more other hardware modules of the UE 101 to provide the user interface for manipulating the ordering platform 103.

Figure 3:
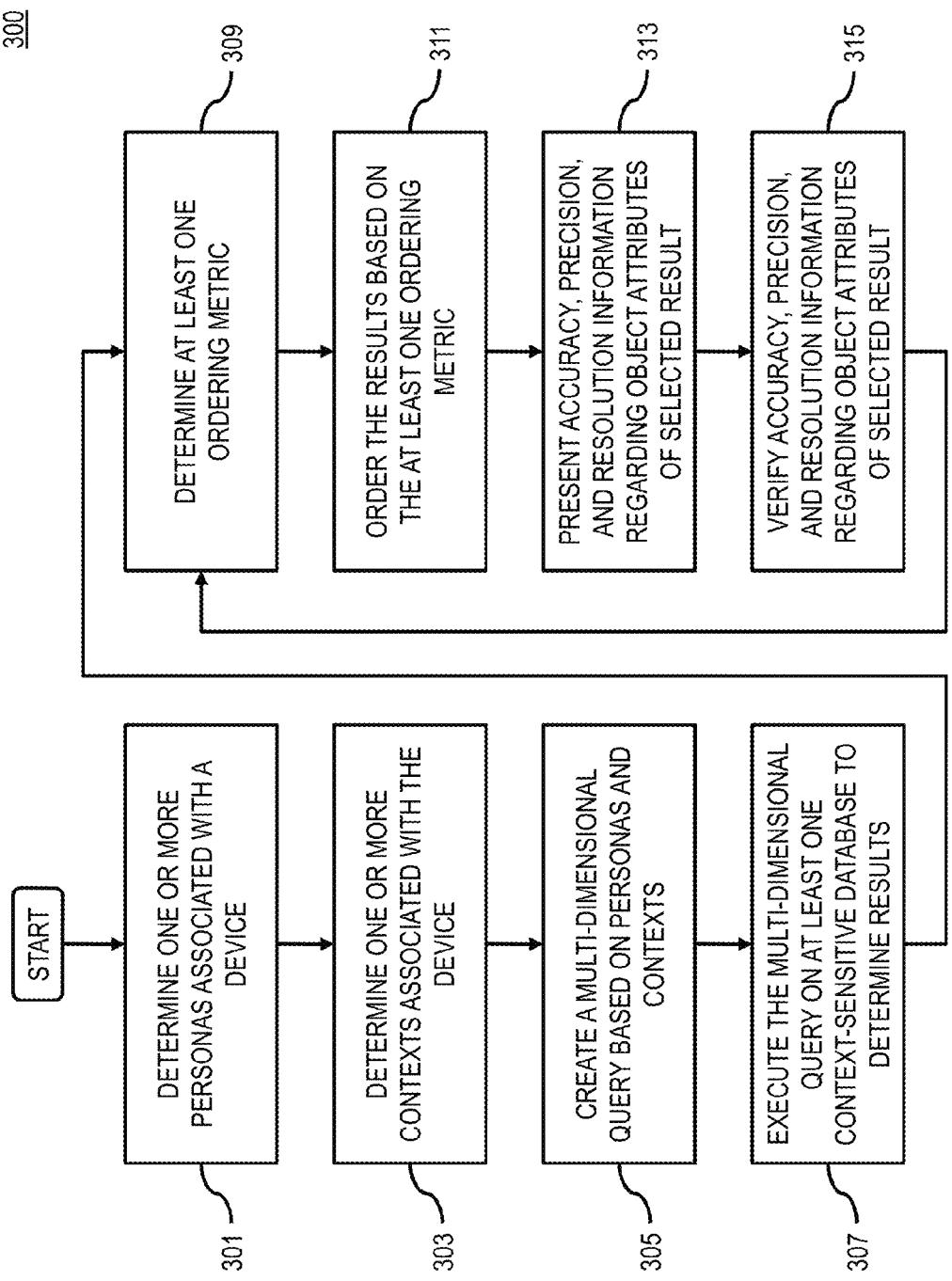
FIG. 3 is a flowchart of a process for providing an ordering metric for a multi-dimensional contextual query, according to one embodiment.
Figure 6:
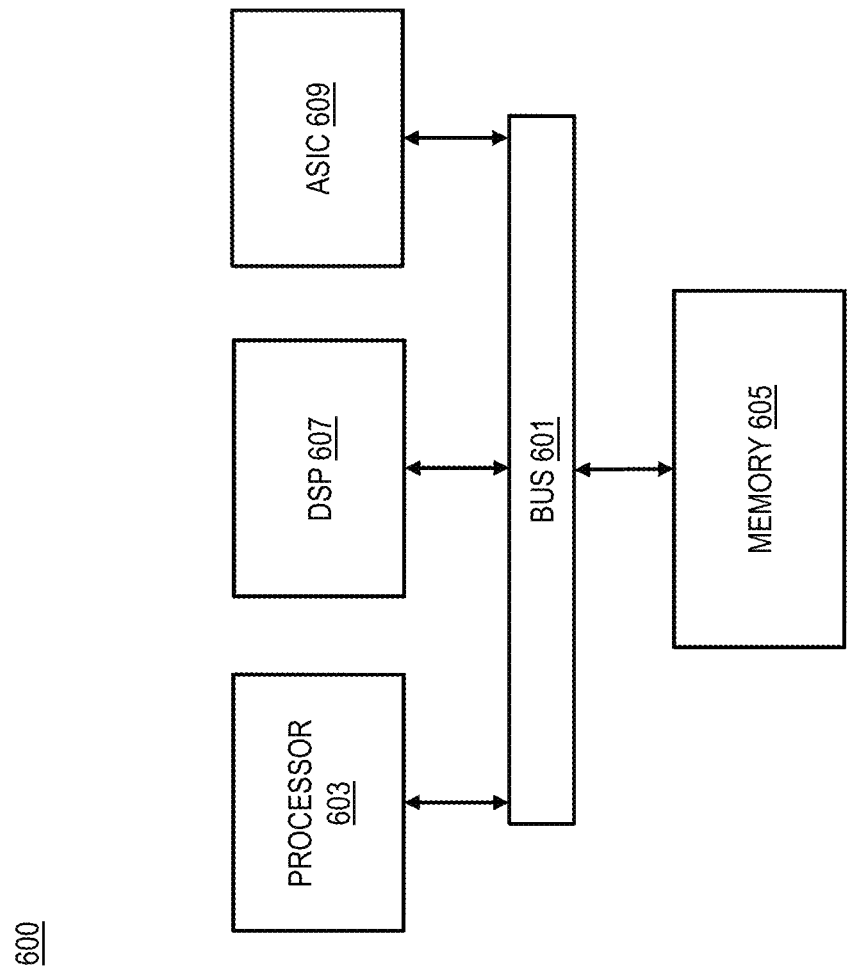
FIG. 6 is a diagram of a chip set that can be used to implement an embodiment of the invention.

FIG. 3 is a flowchart of a process 300 for providing an ordering metric for a multi-dimensional contextual query, according to one embodiment. In one embodiment, the ordering platform 103 performs the process 300 and is implemented in, for instance, a chip set including a processor and a memory as shown in FIG. 6.

In step 301, the ordering platform 103 determines one or more personas associated with a device (e.g., the UE 101). As discussed above, the personas include, for example, the quantity and type of users that are associated with a device. By way of example, one device is associated with a family that includes a husband, a wife, and five children. In one embodiment, the persona can further be defined by the gender and age group of the children. For example, the five children may include one adult (e.g., over the age of eighteen) female, one teenage (e.g., the ages of thirteen to seventeen) male, one male child (e.g., the ages of two to twelve), and two infant (e.g., younger than two) females. In one embodiment, there may be no distinction between parents and children. For example, the above family would be represented by seven individuals, including one adult male, two adult females, one teenage male, one child male, and two infant females.

Based on the personas, the ordering platform 103 associates the device with one or more situations that are associated with one or more user contextual attributes and/or contexts associated with the members that comprise the persona. For example, by associating a persona of a device with an infant, the ordering platform 103 can associate the device with situations involving infants and user contextual attributes related to infants, such as whether a restaurant has an infant changing room or table in the restroom, whether a location is infant friendly, etc. By associating a persona of a device with an infant and a mother, the ordering platform can associate the device situations involving an infant and the mother of the infant, such as whether a restaurant allows public breast feeding, whether a restaurant has private seating for mothers with infants, etc. By automatically associated the users and/or the device with the personas and related user contextual attributes, the ordering platform 103 is able to determine and handle a wider range of context information based on situational awareness.

In one embodiment, step 301 is performed each time the device interacts with the ordering platform 103 for providing an ordering metric for ordering results of a multi-dimensional contextual query. For example, a first time a device interacts with the ordering platform 103, the user of the device sets up a persona, which is later deleted after ending the interactions with the ordering platform 103. The second time the user interacts with the ordering platform 103, the user is requested to provide information for the persona representing the individuals associated with the device for that particular query. In one embodiment, step 301 is performed to create a default persona that is used each time a multi-dimensional query is issued for determining results of a context-aware database and providing an ordering metric for ordering the results. When the user of the device desires to receive results for a persona other than the default persona, the user is able to temporarily change the persona to a different persona.

In step 303, the ordering platform 103 determines one or more contexts associated with the user of the device and/or the device. The contexts can be related to or further define user contextual attributes associated with the persona setup in step 301 or can be independent of the persona. For example, the contexts can include the current location of the device, a future location of the device based on an application 111a running on the device (e.g., a navigation application with an active route guidance), the current time, a future time based on an application 111b running on the device (e.g., a calendar application with an active or future appointment), etc. The contexts are acquired from any source within the system 100, such as from one or more applications 111 running on the device, one or more sensors 117 associated with the device, one or more services 107 on the service platform 109, and/or one or more content providers 113.

In step 305, the ordering platform 103 creates a multi-dimensional query based on the persona and contexts generated from steps 301 and 303 above. The multi-dimensional contextual query includes the situational information associated with the persona from step 301 and includes the context information acquired in step 303. The multi-dimensional query can be of N dimensions.

As discussed above, one dimension can include a contextual dimension for comparing one or more user contextual attributes to one or more object contextual attributes. Further, one dimension can include a contextual relation dimension for evaluating one or more relations among the one or more user contextual attributes and the one or more object contextual attributes. The contextual relation dimension specifies weighting information, priority information, or a combination thereof of the one or more user contextual attributes, the one or more object contextual attributes, or a combination thereof. One dimension can include an inclusion dimension for determining whether to include respective ones of the one or more results of the multi-dimensional query in a list presented to the user on the user's device. One dimension can include the semantic task that the user is involved in, such as finding a restaurant to eat at with the entire family.

In step 307, the ordering platform 103 executes the multi-dimensional query on at least one context-sensitive database 115a to generate one or more results corresponding to object within the databases 115 with their corresponding object contextual attributes. In step 309, the ordering platform 103 determines at least one ordering metric for ordering the one or more results at the device. As discussed above, the ordering metric can be based on a current persona associated with the device, current context information associated with the device, one or more user contextual attributes, one or more object contextual attributes, and/or the multi-dimensional query. The ordering metric can also be based on interaction information at a user interface of the device according to a user modifying any of the above parameters that can modify the ordering metric. By way of example, the user can interact with the device to change the persona information associate with the users of the device from including an infant to not including an infant. Thus, the ordering metric is then based on a persona that does not include an infant and is able to order the results of the multi-dimensional query differently according to the new persona.

In step 311, the ordering platform 103 orders the results of the query based on the at least one ordering metric. The results are ordered based on the object contextual attributes for each of the objects according to the at least one ordering metric. As discussed above, the at least one ordering metric is based, at least in part, on the current persona by ordering object contextual attributes of the one or more results based on the quantity and type of users associated with the device. By way of example, where the users associated with the device include an infant, the at least one ordering metric is focused towards points of interests associated with infants. The at least one ordering metric is based, at least in part, on the current context associated with the device by ordering the object contextual attributes of the one or more results based on the current context. By way of example, where objects include object contextual attributes concerning hours of operation (e.g., hours a restaurant is open, hours for a sale at a store, hours a park is open), the at least one ordering metric orders the objects according to the object contextual attributes that most closely match the current time or a future time. The at least one ordering metric can also be based, at least in part, on the dimensions of the multi-dimensional query. As discussed above, the dimensions of the multi-dimensional contextual query can include a contextual dimension for comparing the one or more of user contextual attributes and the one or more object contextual attributes, a contextual relation dimension for evaluating one or more relations among the one or more user contextual attributes and the one or more object contextual attributes, and an inclusion dimension for determining whether to include respective ones of the one or more results in a result list. The multi-dimensional query can also include a dimension including the semantic task that the user is involved in. By way of example, if the user is looking for a particular type of restaurant, the ordering metric can include information regarding the particular type of restaurant to rank objects associated with the particular type of restaurant higher than other restaurants.

In step 313, the ordering platform 103 presents accuracy, precision, and/or resolution information regarding the object contextual attributes of the one or more object results of the query. In one embodiment, the ordering platform 103 presents the accuracy, the precision, and/or the resolution information regarding any number of the results of the one or more results. In one embodiment, the ordering platform 103 presents the accuracy, the precision, and/or the resolution information for only a selected one or more of the results of the query.

As discussed above, the accuracy, the precision, and the resolution of the object contextual attributes are stored in the databases 115. The accuracy, the precision, and the resolution of the object contextual attributes are based on such binary values as yes/no or normalized continuous range values such as between 0 and 1. The ordering platform 103 presents the determined values of the accuracy, the precision, and the resolution of the object contextual attributes to the user when the objects are presented as results of the multi-dimensional query.

In step 315, the ordering platform 103 verifies the accuracy, the precision, and/or the resolution of the information regarding the object contextual attributes based on information inputted from the user. By way of example, a user visiting a restaurant who visits the restroom may wish to leave a review regarding the cleanliness of the restaurant. The ordering platform 103 allows the user to enter values regarding the cleanliness of the restroom, such as yes or no, or a normalized value from 0 to 1 (or 1 to 10, etc.) representing various degrees of cleanliness. The ordering platform 103 also allows the user of the device to enter text string values such as, "The worst restroom I have seen to date" to allow for more specificity regarding the object contextual attribute of cleanliness of the restroom. The ordering platform 103 also allows the user of the device to specify more detailed reviews of, for example, restrooms by reviewing parts of the restroom, such as the sink, the toilet, the towels, the floor, etc. Upon the user entering a review of one or more of the object contextual attributes, the ordering platform 103 updates the accuracy, the precision, and/or the resolution of the object contextual attribute based on, for example, a weighted sun, a weighted average, or any other method to update the information and add to the information stored within the databases 115. Thus, the process 300 allows users to add to the situational-aware, context-sensitive information stored within the databases.

In one embodiment, after step 315, the process 300 proceeds back to step 309 based on an indication that any one of the persona, the context, the user contextual attributes, the object contextual attributes, and/or the dimensions have changed indicating that a new ordering metric is created. In this situation, the new ordering metric newly orders the results of the multi-dimensional query without having to query the databases 115 again. This saves time and resources because the information is already at the mobile device. Alternatively, after step 315, the process 300 proceeds back to step 301 for the entire process to be run again in the event that the user wants to create a new multi-dimensional query and determine a new list of results.

Figure 4A:
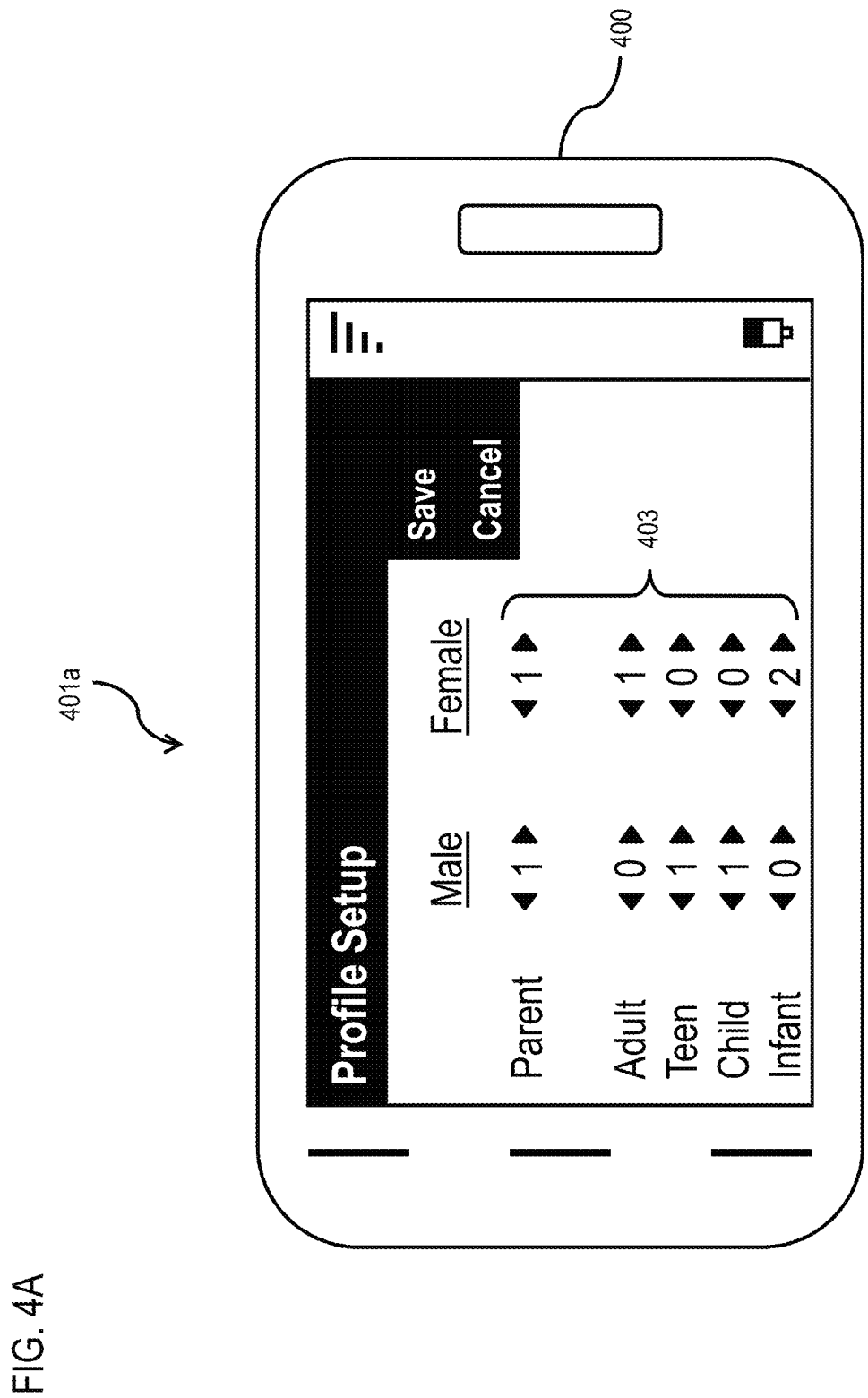
FIGS. 4A-4E are diagrams of user interfaces utilized in the process of FIG. 3, according to various embodiments.

FIGS. 4A-4E are diagrams of user interfaces utilized in the processes of FIG. 3, according to various embodiments. FIG. 4A illustrates a user interface 401a of a device 400 (e.g., a UE 101) based on an initial setup of an application 111a interfacing with the ordering platform 103. As discussed above, the user interface 401a includes inputs 403 that allow a user to indicate, for example, the gender, type and quantity of individuals associated with the device 400 to setup the persona associated with the device. By way of example, the persona associated with the device 400 includes one adult male parent, one adult female parent, an adult female non-parent, one teenage male, one child male, and two infant females. The user interface 401a is illustrated when the user wants update or create a persona.

Figure 4B:
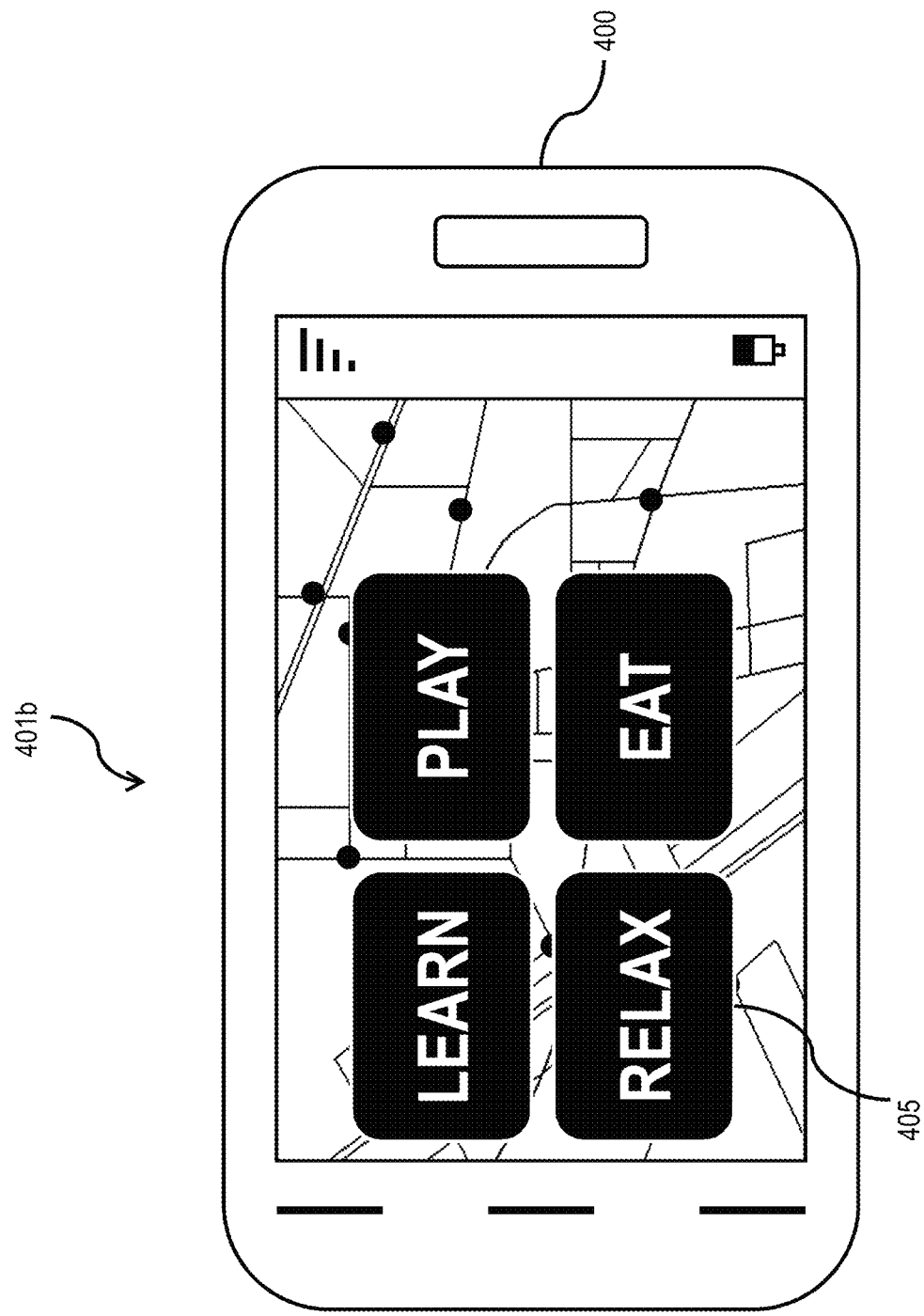

FIG. 4B illustrates a user interface 401b of an application 111a running on a device 400 interfacing with the ordering platform 103. The user interface 401b includes one or more indicators 405 that allow a user to begin a query to determine, for examples, points of interest that the user may wish to visit. By way of example, the user may select the "EAT" indicator 405 to find points of interest involving places to eat. Upon selecting one of the indicators 405, the user interface indicates for the ordering platform 103 to execute a multi-dimensional query on the databases 115 to generate a list of results (e.g., objects) that correspond to the persona and context of associated with the user and/or the device.

Figure 4C:
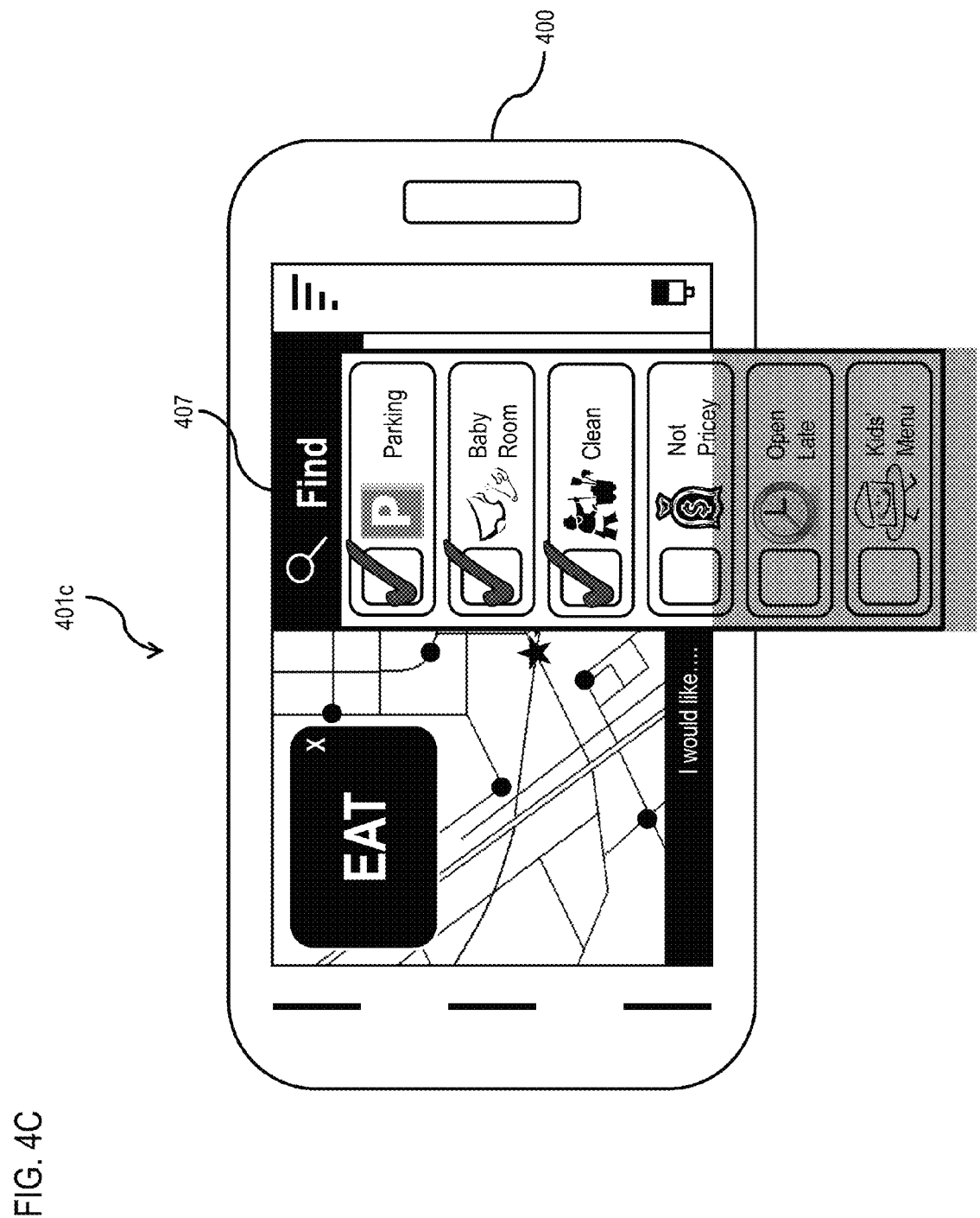

FIG. 4C illustrates the user interface 401c of an application 111a running on a device 400 interfacing with the ordering platform 103 including user contextual attributes 407 (and correspondingly object contextual attributes) associated with the determined persona associated with the device 400 that aid the user in finding relevant points of interest. By way of example, if the persona of the user of the device includes a mother with her infant child, the user contextual attributes associated with, for example, parking, a baby room and clean points of interest are determined as the most relevant contextual attributes the user is interested based on the persona. Scrolling down the list of contextual attributes 407 allows the user to select or de-select other contextual attributes, such as, for example, points of interest that are not pricey, points of interest that are open late, and points of interest that have a kids' menu for modify the user contextual attributes associated with the user and/or the device to generate and/or modify the ordering metric.

Figure 4D:
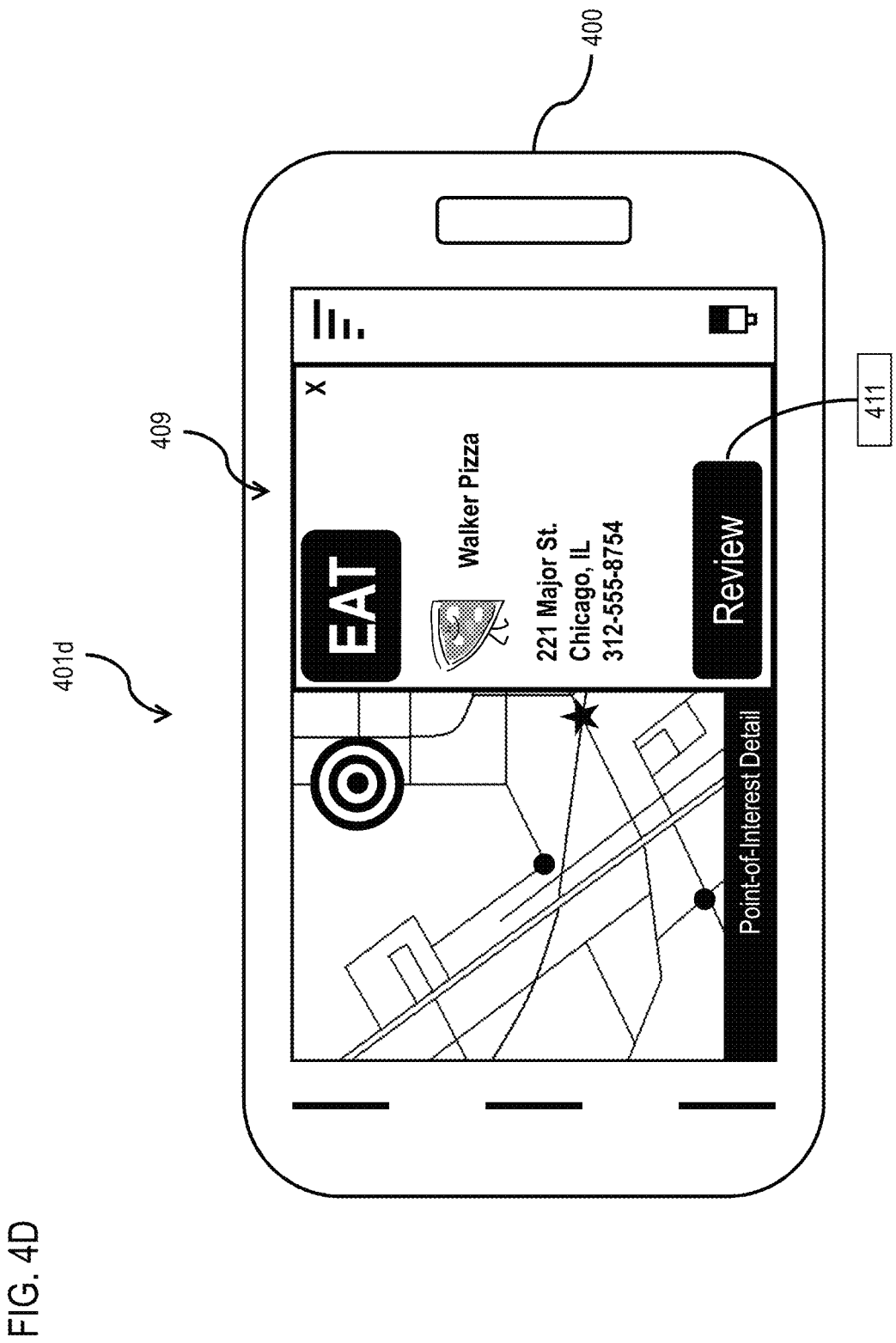

FIG. 4D illustrates the user interface 401d of an application 111a running on a device 400 interfacing with the ordering platform 103 illustrating detailed information regarding a selected point of interest. Indicator 409 illustrates the specific information regarding the point of interest, such as the name (e.g., Walker Pizza), address (221 Major St., Chicago, Ill.), and phone number (e.g., 312-555-8754) of the point of interest. Included within indicator 409 is indicator 411 that allows a user of the device 400 to enter a review for the particular point of interest.

Figure 4E:
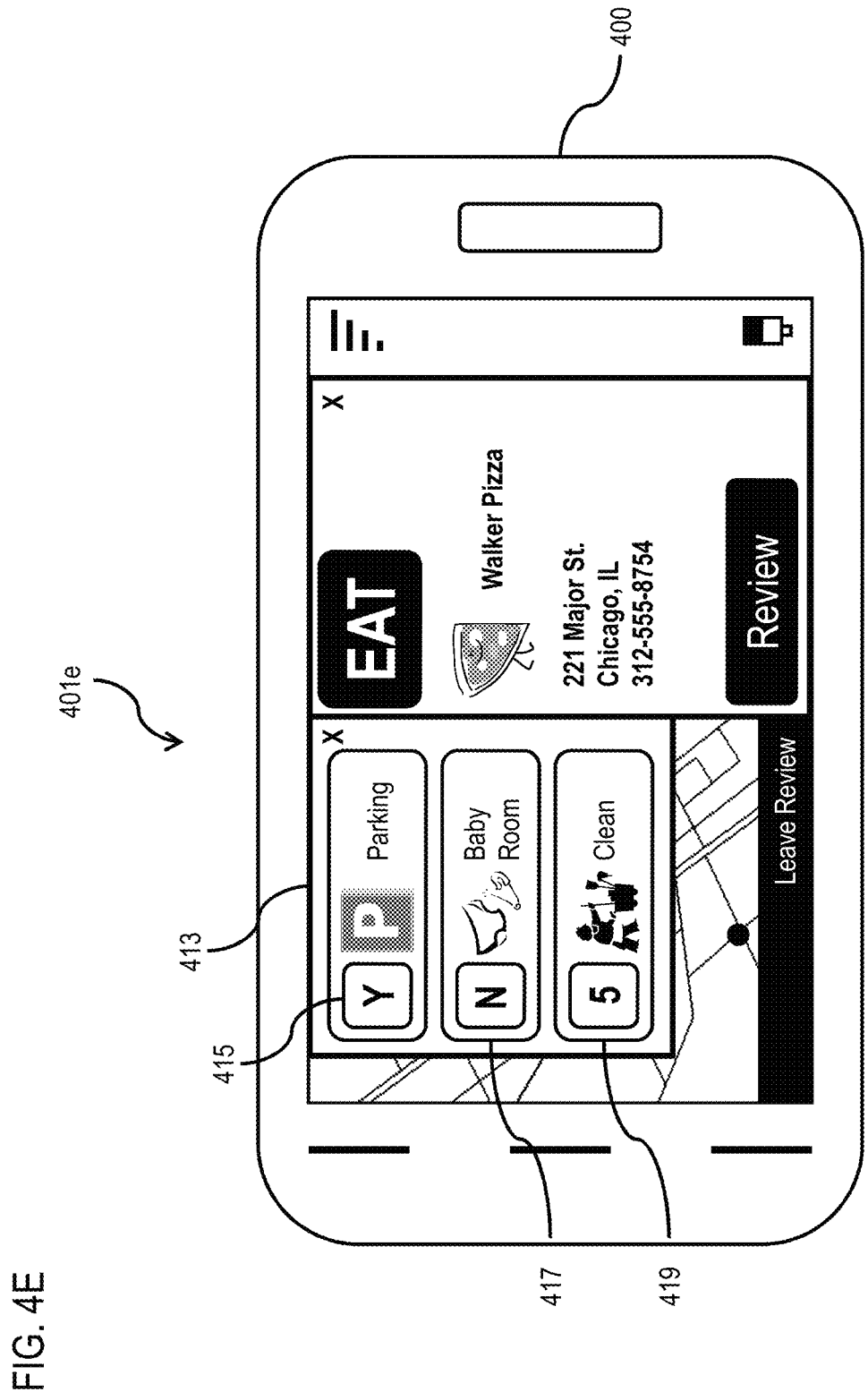

FIG. 4E illustrates the user interface 401e of an application 111a running on a device 400 interfacing with the ordering platform 103 illustrating the interface for leaving a review of a particular point of interest. By way of example, the user interface 401e includes indicator 413 that includes the object contextual attributes associated with the particular point of interest. As illustrated, a user of the device 400 is allowed to enter reviews of the point of interest based on the particular object contextual attributes by which the point of interest was selected for presentation to the user. In one embodiment, the user can also enter reviews of the object contextual attributes that were not used in selecting the particular object, such as the noise level of a restaurant. As discussed above, the particular point of interest Walker Pizza was selected because the point of interest had object contextual attributes of parking, a baby room, and cleanliness based on the checkmarks of the contextual attributes 407 illustrated in FIG. 4C. Indicators 415, 417 and 419 illustrate exemplary ratings of the point of interest. By way of example, the user of the device 400 can indicate whether an object contextual attribute actually existed based on the inclusion of Y for "yes" or N for "no." The user of the device 400 can also give a numerical value of the object contextual attribute, such as 1-10 representing highly agree (e.g., 1) and highly disagree (e.g., 10) and the different values there between. In one embodiment, the user can also leave text strings regarding the reviews of the object contextual attributes of the point of interest. Based on the above, the ordering platform 103 enters the information entered by the user at the databases 115 to modify the accuracy, the precision and the resolution of the particular object contextual attribute, thus enriching the datasets at the databases 115.

The processes described herein for providing an ordering metric of a multi-dimensional contextual query may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 5:
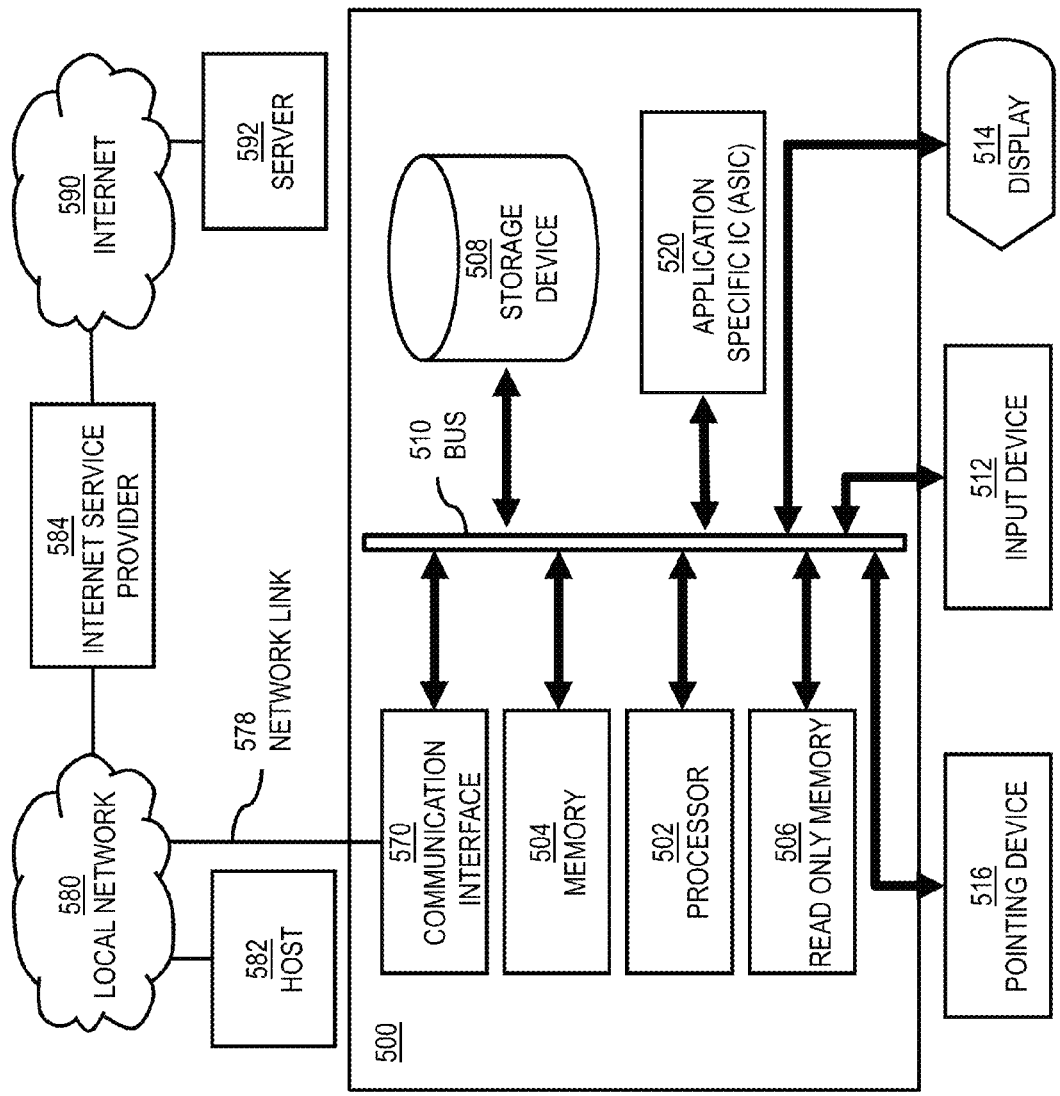
FIG. 5 is a diagram of hardware that can be used to implement an embodiment of the invention.

FIG. 5 illustrates a computer system 500 upon which an embodiment of the invention may be implemented. Although computer system 500 is depicted with respect to a particular device or equipment, it is contemplated that other devices or equipment (e.g., network elements, servers, etc.) within FIG. 5 can deploy the illustrated hardware and components of system 500. Computer system 500 is programmed (e.g., via computer program code or instructions) to provide ordering metric of a multi-dimensional contextual query as described herein and includes a communication mechanism such as a bus 510 for passing information between other internal and external components of the computer system 500. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and nonzero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 500, or a portion thereof, constitutes a means for performing one or more steps of providing an ordering metric of a multi-dimensional contextual query.

A bus 510 includes one or more parallel conductors of information so that information is transferred quickly among devices coupled to the bus 510. One or more processors 502 for processing information are coupled with the bus 510.

A processor (or multiple processors) 502 performs a set of operations on information as specified by computer program code related to provide an ordering metric of a multi-dimensional contextual query. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 510 and placing information on the bus 510. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 502, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 500 also includes a memory 504 coupled to bus 510. The memory 504, such as a random access memory (RAM) or any other dynamic storage device, stores information including processor instructions for providing an ordering metric of a multi-dimensional contextual query. Dynamic memory allows information stored therein to be changed by the computer system 500. RAM allows a unit of information stored at a location called a memory address to be stored and retrieved independently of information at neighboring addresses. The memory 504 is also used by the processor 502 to store temporary values during execution of processor instructions. The computer system 500 also includes a read only memory (ROM) 506 or any other static storage device coupled to the bus 510 for storing static information, including instructions, that is not changed by the computer system 500. Some memory is composed of volatile storage that loses the information stored thereon when power is lost. Also coupled to bus 510 is a non-volatile (persistent) storage device 508, such as a magnetic disk, optical disk or flash card, for storing information, including instructions, that persists even when the computer system 500 is turned off or otherwise loses power.

Information, including instructions for providing an ordering metric of a multi-dimensional contextual query, is provided to the bus 510 for use by the processor from an external input device 512, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 500. Other external devices coupled to bus 510, used primarily for interacting with humans, include a display device 514, such as a cathode ray tube (CRT), a liquid crystal display (LCD), a light emitting diode (LED) display, an organic LED (OLED) display, a plasma screen, or a printer for presenting text or images, and a pointing device 516, such as a mouse, a trackball, cursor direction keys, or a motion sensor, for controlling a position of a small cursor image presented on the display 514 and issuing commands associated with graphical elements presented on the display 514. In some embodiments, for example, in embodiments in which the computer system 500 performs all functions automatically without human input, one or more of external input device 512, display device 514 and pointing device 516 is omitted.

In the illustrated embodiment, special purpose hardware, such as an application specific integrated circuit (ASIC) 520, is coupled to bus 510. The special purpose hardware is configured to perform operations not performed by processor 502 quickly enough for special purposes. Examples of ASICs include graphics accelerator cards for generating images for display 514, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 500 also includes one or more instances of a communications interface 570 coupled to bus 510. Communication interface 570 provides a one-way or two-way communication coupling to a variety of external devices that operate with their own processors, such as printers, scanners and external disks. In general the coupling is with a network link 578 that is connected to a local network 580 to which a variety of external devices with their own processors are connected. For example, communication interface 570 may be a parallel port or a serial port or a universal serial bus (USB) port on a personal computer. In some embodiments, communications interface 570 is an integrated services digital network (ISDN) card or a digital subscriber line (DSL) card or a telephone modem that provides an information communication connection to a corresponding type of telephone line. In some embodiments, a communication interface 570 is a cable modem that converts signals on bus 510 into signals for a communication connection over a coaxial cable or into optical signals for a communication connection over a fiber optic cable. As another example, communications interface 570 may be a local area network (LAN) card to provide a data communication connection to a compatible LAN, such as Ethernet. Wireless links may also be implemented. For wireless links, the communications interface 570 sends or receives or both sends and receives electrical, acoustic or electromagnetic signals, including infrared and optical signals, that carry information streams, such as digital data. For example, in wireless handheld devices, such as mobile telephones like cell phones, the communications interface 570 includes a radio band electromagnetic transmitter and receiver called a radio transceiver. In certain embodiments, the communications interface 570 enables connection to the communication network 105 for providing an ordering metric of a multi-dimensional contextual query to the UE 101.

The term "computer-readable medium" as used herein refers to any medium that participates in providing information to processor 502, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 508. Volatile media include, for example, dynamic memory 504. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 520.

Network link 578 typically provides information communication using transmission media through one or more networks to other devices that use or process the information. For example, network link 578 may provide a connection through local network 580 to a host computer 582 or to equipment 584 operated by an Internet Service Provider (ISP). ISP equipment 584 in turn provides data communication services through the public, world-wide packet-switching communication network of networks now commonly referred to as the Internet 590.

A computer called a server host 592 connected to the Internet hosts a process that provides a service in response to information received over the Internet. For example, server host 592 hosts a process that provides information representing video data for presentation at display 514. It is contemplated that the components of system 500 can be deployed in various configurations within other computer systems, e.g., host 582 and server 592.

At least some embodiments of the invention are related to the use of computer system 500 for implementing some or all of the techniques described herein. According to one embodiment of the invention, those techniques are performed by computer system 500 in response to processor 502 executing one or more sequences of one or more processor instructions contained in memory 504. Such instructions, also called computer instructions, software and program code, may be read into memory 504 from another computer-readable medium such as storage device 508 or network link 578. Execution of the sequences of instructions contained in memory 504 causes processor 502 to perform one or more of the method steps described herein. In alternative embodiments, hardware, such as ASIC 520, may be used in place of or in combination with software to implement the invention. Thus, embodiments of the invention are not limited to any specific combination of hardware and software, unless otherwise explicitly stated herein.

The signals transmitted over network link 578 and other networks through communications interface 570, carry information to and from computer system 500. Computer system 500 can send and receive information, including program code, through the networks 580, 590 among others, through network link 578 and communications interface 570. In an example using the Internet 590, a server host 592 transmits program code for a particular application, requested by a message sent from computer 500, through Internet 590, ISP equipment 584, local network 580 and communications interface 570. The received code may be executed by processor 502 as it is received, or may be stored in memory 504 or in storage device 508 or any other non-volatile storage for later execution, or both. In this manner, computer system 500 may obtain application program code in the form of signals on a carrier wave.

Various forms of computer readable media may be involved in carrying one or more sequence of instructions or data or both to processor 502 for execution. For example, instructions and data may initially be carried on a magnetic disk of a remote computer such as host 582. The remote computer loads the instructions and data into its dynamic memory and sends the instructions and data over a telephone line using a modem. A modem local to the computer system 500 receives the instructions and data on a telephone line and uses an infra-red transmitter to convert the instructions and data to a signal on an infra-red carrier wave serving as the network link 578. An infrared detector serving as communications interface 570 receives the instructions and data carried in the infrared signal and places information representing the instructions and data onto bus 510. Bus 510 carries the information to memory 504 from which processor 502 retrieves and executes the instructions using some of the data sent with the instructions. The instructions and data received in memory 504 may optionally be stored on storage device 508, either before or after execution by the processor 502.

FIG. 6 illustrates a chip set or chip 600 upon which an embodiment of the invention may be implemented. Chip set 600 is programmed to provide an ordering metric of a multi-dimensional contextual query as described herein and includes, for instance, the processor and memory components described with respect to FIG. 5 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 600 can be implemented in a single chip. It is further contemplated that in certain embodiments the chip set or chip 600 can be implemented as a single "system on a chip." It is further contemplated that in certain embodiments a separate ASIC would not be used, for example, and that all relevant functions as disclosed herein would be performed by a processor or processors. Chip set or chip 600, or a portion thereof, constitutes a means for performing one or more steps of providing user interface navigation information associated with the availability of functions. Chip set or chip 600, or a portion thereof, constitutes a means for performing one or more steps of providing an ordering metric of a multi-dimensional contextual query.

In one embodiment, the chip set or chip 600 includes a communication mechanism such as a bus 601 for passing information among the components of the chip set 600. A processor 603 has connectivity to the bus 601 to execute instructions and process information stored in, for example, a memory 605. The processor 603 may include one or more processing cores with each core configured to perform independently. A multi-core processor enables multiprocessing within a single physical package. Examples of a multi-core processor include two, four, eight, or greater numbers of processing cores. Alternatively or in addition, the processor 603 may include one or more microprocessors configured in tandem via the bus 601 to enable independent execution of instructions, pipelining, and multithreading. The processor 603 may also be accompanied with one or more specialized components to perform certain processing functions and tasks such as one or more digital signal processors (DSP) 607, or one or more application-specific integrated circuits (ASIC) 609. A DSP 607 typically is configured to process real-world signals (e.g., sound) in real time independently of the processor 603. Similarly, an ASIC 609 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 600 includes merely one or more processors and some software and/or firmware supporting and/or relating to and/or for the one or more processors.

The processor 603 and accompanying components have connectivity to the memory 605 via the bus 601. The memory 605 includes both dynamic memory (e.g., RAM, magnetic disk, writable optical disk, etc.) and static memory (e.g., ROM, CD-ROM, etc.) for storing executable instructions that when executed perform the inventive steps described herein to provide an ordering metric of a multi-dimensional contextual query. The memory 605 also stores the data associated with or generated by the execution of the inventive steps.

Figure 7:
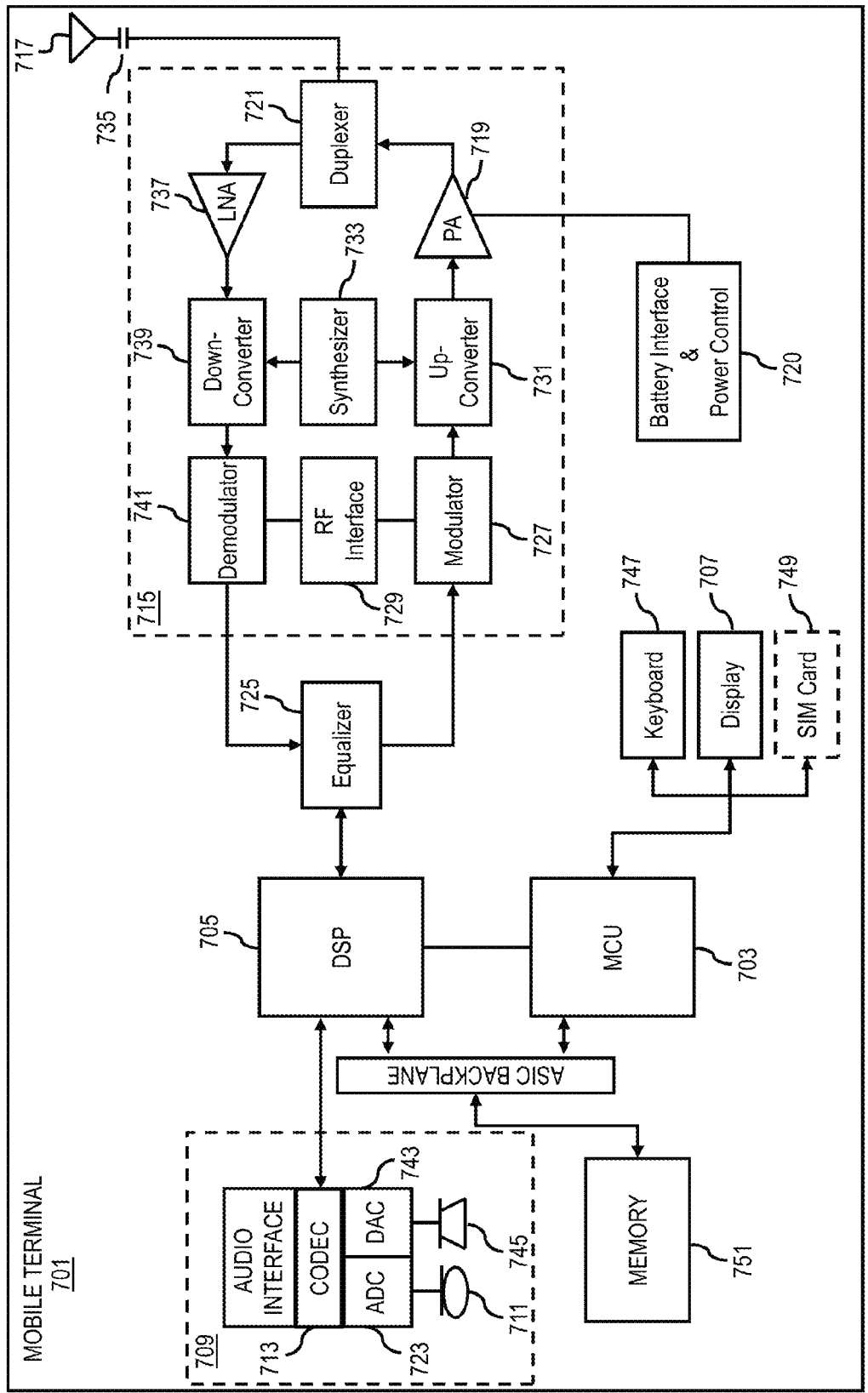
FIG. 7 is a diagram of a mobile terminal (e.g., handset) that can be used to implement an embodiment of the invention.

FIG. 7 is a diagram of exemplary components of a mobile terminal (e.g., handset) for communications, which is capable of operating in the system of FIG. 1, according to one embodiment. In some embodiments, mobile terminal 701, or a portion thereof, constitutes a means for performing one or more steps of providing an ordering metric of a multi-dimensional contextual query. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 703, a Digital Signal Processor (DSP) 705, and a receiver/transmitter unit including a microphone gain control unit and a speaker gain control unit. A main display unit 707 provides a display to the user in support of various applications and mobile terminal functions that perform or support the steps of providing an ordering metric of a multi-dimensional contextual query. The display 707 includes display circuitry configured to display at least a portion of a user interface of the mobile terminal (e.g., mobile telephone). Additionally, the display 707 and display circuitry are configured to facilitate user control of at least some functions of the mobile terminal. An audio function circuitry 709 includes a microphone 711 and microphone amplifier that amplifies the speech signal output from the microphone

711. The amplified speech signal output from the microphone 711 is fed to a coder/decoder (CODEC) 713.

A radio section 715 amplifies power and converts frequency in order to communicate with a base station, which is included in a mobile communication system, via antenna 717. The power amplifier (PA) 719 and the transmitter/modulation circuitry are operationally responsive to the MCU 703, with an output from the PA 719 coupled to the duplexer 721 or circulator or antenna switch, as known in the art. The PA 719 also couples to a battery interface and power control unit 720.

In use, a user of mobile terminal 701 speaks into the microphone 711 and his or her voice along with any detected background noise is converted into an analog voltage. The analog voltage is then converted into a digital signal through the Analog to Digital Converter (ADC) 723. The control unit 703 routes the digital signal into the DSP 705 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 725 for compensation of any frequency-dependent impairments that occur during transmission though the air such as phase and amplitude distortion. After equalizing the bit stream, the modulator 727 combines the signal with a RF signal generated in the RF interface 729. The modulator 727 generates a sine wave by way of frequency or phase modulation. In order to prepare the signal for transmission, an up-converter 731 combines the sine wave output from the modulator 727 with another sine wave generated by a synthesizer 733 to achieve the desired frequency of transmission. The signal is then sent through a PA 719 to increase the signal to an appropriate power level. In practical systems, the PA 719 acts as a variable gain amplifier whose gain is controlled by the DSP 705 from information received from a network base station. The signal is then filtered within the duplexer 721 and optionally sent to an antenna coupler 735 to match impedances to provide maximum power transfer. Finally, the signal is transmitted via antenna 717 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 701 are received via antenna 717 and immediately amplified by a low noise amplifier (LNA) 737. A down-converter 739 lowers the carrier frequency while the demodulator 741 strips away the RF leaving only a digital bit stream. The signal then goes through the equalizer 725 and is processed by the DSP 705. A Digital to Analog Converter (DAC) 743 converts the signal and the resulting output is transmitted to the user through the speaker 745, all under control of a Main Control Unit (MCU) 703 which can be implemented as a Central Processing Unit (CPU).

The MCU 703 receives various signals including input signals from the keyboard 747. The keyboard 747 and/or the MCU 703 in combination with other user input components (e.g., the microphone 711) comprise a user interface circuitry for managing user input. The MCU 703 runs a user interface software to facilitate user control of at least some functions of the mobile terminal 701 to provide an ordering metric of a multi-dimensional contextual query. The MCU 703 also delivers a display command and a switch command to the display 707 and to the speech output switching controller, respectively. Further, the MCU 703 exchanges information with the DSP 705 and can access an optionally incorporated SIM card 749 and a memory 751. In addition, the MCU 703 executes various control functions required of the terminal. The DSP 705 may, depending upon the implementation, perform any of a variety of conventional digital processing functions on the voice signals. Additionally, DSP 705 determines the background noise level of the local environment from the signals detected by microphone 711 and sets the gain of microphone 711 to a level selected to compensate for the natural tendency of the user of the mobile terminal 701.

The CODEC 713 includes the ADC 723 and DAC 743. The memory 751 stores various data including call incoming tone data and is capable of storing other data including music data received via, e.g., the global Internet. The software module could reside in RAM memory, flash memory, registers, or any other form of writable storage medium known in the art. The memory device 751 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 749 carries, for instance, important information, such as the cellular phone number, the carrier supplying service, subscription details, and security information. The SIM card 749 serves primarily to identify the mobile terminal 701 on a radio network. The card 749 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating a processing of and/or processing (1) data and/or (2) information and/or (3) at least one signal, the (1) data and/or (2) information and/or (3) at least one signal based, at least in part, on the following:
   a determination of a multi-dimensional query associated with at least one user device, wherein the multi-dimensional query specifies, at least in part, one or more personas, based, at least in part, on more than one person, associated with the at least one user device;
   an execution of the multi-dimensional query on at least one context-sensitive database to generate one or more results; and
   a determination of at least one ordering metric for the one or more results based, at least in part, on one or more user contextual attributes of the at least one user device.

2. A method of claim 1, wherein the (1) data and/or (2) information and/or (3) at least one signal are further based, at least in part, on the following:
   a determination of one or more object contextual attributes associated with the one or more results, wherein the at least one ordering metric is further based, at least in part, on the one or more object contextual attributes.

3. A method of claim 2, wherein the (1) data and/or (2) information and/or (3) at least one signal are further based, at least in part, on the following:
   a determination of an accuracy, a precision, a resolution, or a combination thereof of the one or more object contextual attributes; and
   a display of one or more representations of the accuracy, the precision, the resolution, or a combination thereof.

4. A method of claim 3, wherein the (1) data and/or (2) information and/or (3) at least one signal are further based, at least in part, on the following:
   a determination of the accuracy, the precision, the resolution, or a combination thereof based, at least in part, on sensor information, survey information, user update information, or a combination thereof.

5. A method of claim 4, wherein the (1) data and/or (2) information and/or (3) at least one signal are further based, at least in part, on the following:
   an updating of the one or more object contextual attributes at the at least one context-sensitive database based on the determined accuracy, the determined precision, the determined resolution, or a combination thereof.

6. A method of claim 2, wherein the at least one ordering metric is based, at least in part, on a weighted sum, a weighted average, or a combination thereof of one or more dimensions of the multi-dimensional query.

7. A method of claim 6, wherein the one or more dimensions include, at least in part, (i) a contextual dimension for comparing the one or more user contextual attributes and the one or more object contextual attributes, (ii) a contextual relation dimension for evaluating one or more relations among the one or more user contextual attributes and the one or more object contextual attributes, and (iii) an inclusion dimension for determining whether to include respective ones of the one or more results in a result list.

8. A method of claim 7, wherein the contextual relation dimension specifies weighting information, priority information, or a combination thereof for the one or more user contextual attributes, the one or more object contextual attributes, or combination thereof.

9. A method of claim 1, wherein the multi-dimensional query specifies, at least in part, one or more contexts associated with the at least one user device, and the (1) data and/or (2) information and/or (3) at least one signal are further based, at least in part, on the following:
   a processing of the one or more user contextual attributes to select from among the one or more personas, the one or more contexts, or a combination thereof,
   wherein the at least one ordering metric is based, at least in part, on the selected one or more personas, the selected one or more contexts, or a combination thereof.

10. A method of claim 1, wherein the (1) data and/or (2) information and/or (3) at least one signal are further based, at least in part, on the following:
    a determination of contextual information, interaction information at a user interface of the at least one user device, or a combination thereof associated with the at least one user device; and
    a processing of the contextual information, the interaction information, or a combination thereof to determine, at least in part, the one or more user contextual attributes.

11. An apparatus comprising:
    at least one processor; and
    at least one memory including computer program code for one or more programs,
    the at least one memory and the computer program code configured to, with the at least one processor, cause the apparatus to perform at least the following,
      determine a multi-dimensional query associated with at least one user device, wherein the multi-dimensional query specifies, at least in part, one or more personas, based, at least in part, on more than one person, associated with the at least one user device;
      cause, at least in part, an execution of the multi-dimensional query on at least one context-sensitive database to generate one or more results; and
      determine at least one ordering metric for the one or more results based, at least in part, on one or more user contextual attributes of the at least one user device.

12. An apparatus of claim 11, wherein the apparatus is further caused to:
    determine one or more object contextual attributes associated with the one or more results,
    wherein the at least one ordering metric is further based, at least in part, on the one or more object contextual attributes.

13. An apparatus of claim 12, wherein the apparatus is further caused to:
    determine an accuracy, a precision, a resolution, or a combination thereof of the one or more object contextual attributes; and
    cause, at least in part, a display of one or more representations of the accuracy, the precision, the resolution, or a combination thereof.

14. An apparatus of claim 13, wherein the apparatus is further caused to:
    determine the accuracy, the precision, the resolution, or a combination thereof based, at least in part, on sensor information, survey information, user update information, or a combination thereof.

15. An apparatus of claim 14, wherein the apparatus is further caused to:
    cause, at least in part, an updating of the one or more object contextual attributes at the at least one context-sensitive database based on the determined accuracy, the determined precision, the determined resolution, or a combination thereof.

16. An apparatus of claim 12, wherein the at least one ordering metric is based, at least in part, on a weighted sum, a weighted average, or a combination thereof of one or more dimensions of the multi-dimensional query.

17. An apparatus of claim 16, wherein the one or more dimensions include, at least in part, (i) a contextual dimension for comparing the one or more user contextual attributes and the one or more object contextual attributes, (ii) a contextual relation dimension for evaluating one or more relations among the one or more user contextual attributes and the one or more object contextual attributes, and (iii) an inclusion dimension for determining whether to include respective ones of the one or more results in a result list.

18. An apparatus of claim 17, wherein the contextual relation dimension specifies weighting information, priority information, or a combination thereof for the one or more user contextual attributes, the one or more object contextual attributes, or combination thereof.

19. An apparatus of claim 11, wherein the multi-dimensional query specifies, at least in part, one or more contexts associated with the at least one user device, and the apparatus is further caused to:
  process and/or facilitate a processing of the one or more user contextual attributes to select from among the one or more personas, the one or more contexts, or a combination thereof,
  wherein the at least one ordering metric is based, at least in part, on the selected one or more personas, the selected one or more contexts, or a combination thereof.

20. An apparatus of claim 11, wherein the apparatus is further caused to:
  determine contextual information, interaction information at a user interface of the at least one user device, or a combination thereof associated with the at least one user device; and
  process and/or facilitate a processing of the contextual information, the interaction information, or a combination thereof to determine, at least in part, the one or more user contextual attributes.

* * * * *